United States Patent [19]

Fowler

[11] Patent Number: 4,543,907

[45] Date of Patent: Oct. 1, 1985

[54] APPARATUS FOR SEASONING SNACK FOOD ITEMS

[75] Inventor: David P. Fowler, Irving, Tex.

[73] Assignee: Frito-Lay, Inc., Dallas, Tex.

[21] Appl. No.: 623,704

[22] Filed: Jun. 22, 1984

[51] Int. Cl.$^4$ ............................................. B05C 19/00
[52] U.S. Cl. ....................................... 118/19; 118/24; 366/228
[58] Field of Search ............................ 118/19, 418, 24; 366/228, 57; 34/135

[56] References Cited

U.S. PATENT DOCUMENTS 1,476,840  12/1923  Ranney ................................. 118/19
3,634,947  1/1972  Furgal ............................ 118/418 X

*Primary Examiner*—John P. McIntosh
*Attorney, Agent, or Firm*—Bernard, Rothwell & Brown

[57] ABSTRACT

An improved rotating tumbler drum for use in a snack food seasoning apparatus contains, along at least a portion of its length, a plurality of interior wall segments, each of which is constructed of a material having a coefficient of friction with the snack food items different from that of the segments with which it is contiguous. Snack food items such as potato chips are passed through the drum while the drum is rotated, resulting in a random tumbling motion due to differential friction with the various wall segments. Seasoning material is dispensed onto the randomly tumbling snack food items, so that the seasoning material is uniformly distributed.

1 Claim, 4 Drawing Figures

APPARATUS FOR SEASONING SNACK FOOD ITEMS

BACKGROUND OF THE INVENTION

1. Field of the Invention

This invention relates to an apparatus and method used to season snack food items such as potato chips. More particularly, the invention relates to an improved method of providing seasoning material to the surfaces of snack food items which results in exceptional uniformity in the distribution of the seasoning material among the individual snack food items.

2. Prior Art

Many snack foods known today contain seasoning of one form or another on their surfaces. Typical examples include potato chips with barbecue, sour cream and onion, cheese and like seasoning. Corn chips and other snack foods are also similarly seasoned. The distribution of such seasoning greatly affects not only the product quality, but also the economy of manufacturing.

It is known in the prior art to provide for the automated seasoning of snack food items such as potato chips, corn chips and the like. One conventional seasoning apparatus includes a rotating tumbler drum which causes the snack food items to tumble as the seasoning material is dropped onto them from a seasoning dispenser. The rotating tumbler drum has an opening at one end for the introduction of snack food items and an opening at the other end through which the snack food items can be discharged and means can be introduced into the interior of the drum for dispensing seasoning material onto the snack food items. The end of the drum through which the snack food items are introduced is elevated with respect to the discharge end so that the snack food items are moved by gravitation toward the discharge end. Typically, the drum contains a plurality of flights or projections which extend inwardly from the interior surface of the drum wall along at least a portion of the drum length. As the snack food items move along the length of the interior of the drum, the drum is rotated about its central axis. As the drum rotates, portions of the snack food items are caught by the flights or projections and carried upwardly along the side of the drum until the angle of the flights is such that the snack food items cascade over the flights, resulting in a tumbling action. A seasoning dispensing apparatus is typically provided which extends into the drum interior and conveys seasoning material from a hopper located outside the drum to a point inside the drum directly above the tumbling snack food items. The seasoning material is dispensed onto the tumbling snack food items in the form of a seasoning curtain. The seasoned snack food items then exit the drum through the discharge end.

While the aforementioned arrangement provides a convenient, automated method for seasoning snack food items, the distribution of seasoning material among the individual snack food items has not always been as uniform as desired. This is believed to be due to a wavelike tumbling pattern which is set up as the snack food items cascade over each flight or projection on the drum wall. This pattern causes the seasoning material to be distributed in a non-uniform manner among the individual snack food items. Accordingly, there is needed a method for seasoning snack food items which provides the convenience and automation associated with the rotating tumbler drum type device but provides a degree of uniformity of seasoning distribution not heretofore obtainable with that type of device.

SUMMARY OF THE INVENTION

The present invention provides an improved rotating tumbler drum for use in a snack food seasoning apparatus. The rotating tumbler drum of the invention causes the snack food items to tumble in a random manner, thereby eliminating the tumbling pattern which has caused lack of uniformity of seasoning distribution in previous rotating tumbler drums. The rotating tumbler drum of the invention comprises a drum having an opening at one end through which snack food items can be introduced and an opening at the other end through which snack food items can be discharged and through which means can be introduced into the interior of the drum for distributing the seasoning material, the interior wall surface of the drum comprising, along at least a portion of its length, a plurality of wall segments having significantly differing coefficients of friction with the snack food items. The individual wall segments having varying coefficients of friction are randomly sized and positioned along the drum wall. The variation in coefficients of friction among the randomly sized and positioned wall segments causes some of the snack food items to be carried relatively high up the side of the drum as the drum rotates while some of the snack food items slide down the side of the drum at a relatively low point. The resulting randomization of the tumbling pattern allows for a more uniform distribution of seasoning material on the snack food items. While the wall segments of varying coefficients of friction can be used in conjunction with flights or projections on the interior drum wall to improve performance, it is preferred to eliminate the flights or projections on the interior of the drum wall entirely and to rely on the friction between the wall segments and the snack food items to produce the desired random tumbling effect.

There is also provided an improved method of seasoning snack food items which entails introducing snack food items into a rotational tumbling zone; causing the snack food items to tumble randomly within the rotational tumbling zone by imparting differential rotary frictional forces to the snack food items; and continuously dispensing seasoning material onto the randomly tumbling snack food items in the rotational tumbling zone, so that seasoning material is uniformly distributed among the snack food items.

DETAILED DESCRIPTION OF THE PREFERRED EMBODIMENTS

The snack food items which can be seasoned using the apparatus and method of the invention include any snack food items capable of being tumbled in a rotating tumbler drum such as potato chips, corn chips or puffed farinaceous food products, e.g., puff-extruded cornmeal which has been cut into individual pieces. While the method of the invention will be described hereinafter with reference to potato chips, it is to be understood that other suitable snack food items may also be seasoned in this manner.

The seasoning material can be any powdered or fine particulate seasoning material which is applied to enhance the flavor of the snack food item, including mixtures thereof. The seasoning material is generally pre-blended to impart the desired flavor characteristics to the snack food items, e.g., barbecue flavor, cheese flavor, sour cream and onion flavor, etc.

Figure 1:
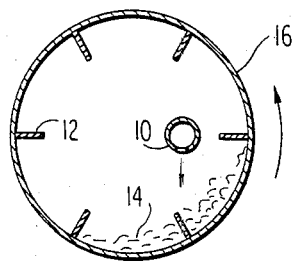
FIG. 1 is a cross-sectional end view of a rotating tumbler drum of the prior art containing flights for carrying the tumbling snack food items up the drum wall.

The apparatus and method of the invention will be more clearly understood with reference to the accompanying drawings. FIG. 1 is a cross-sectional end view of a rotating tumbler drum 16 of the prior art containing a tumbling mass of potato chips 14. The prior art device employs a series of inwardly projecting flights 12, which cause the tumbling motion in the mass of potato chips 14. Seasoning material is dispensed onto the tumbling mass of potato chips 14 from a distribution tube 10. As will be appreciated from the description of the tumbler drum of the invention and from FIGS. 2, 3 and 4, the tumbler drum of the invention eliminates the need for the inwardly projecting flights 12, while improving the randomness of the tumbling pattern of the potato chips 14.

Figure 2:
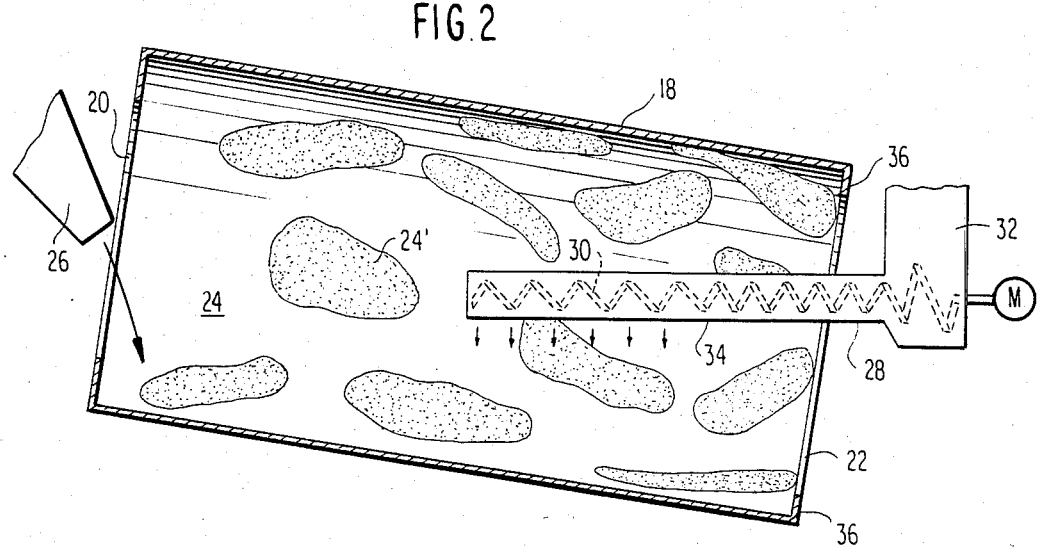
FIG. 2 is a cross-sectional side view of a rotating tumbler drum of the invention being used in conjunction with a seasoning dispenser to season snack food items.
Figure 3:
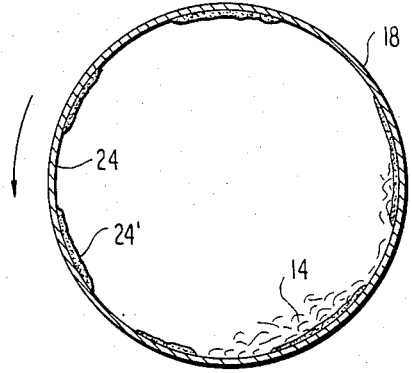
FIG. 3 is a cross-sectional end view of the rotating tumbler drum of the invention, containing a tumbling mass of snack food items.

Referring to FIGS. 2 and 3, the rotating tumbler drum of the invention comprises a cylindrical drum 18 having an opening 20 at one end through which the potato chips 14 are introduced and an opening 22 at the other end through which potato chips 14 are discharged. A portion of the interior wall surface 24 of the drum 18 contains a plurality of individual wall segments 24' having coefficients of friction with the potato chips 14 that vary significantly from each other and from the interior wall surface 24 of the drum 18. The individual wall segments 24' having different coefficients of friction are preferably varied randomly with respect to size (surface area), geometry and coefficient of friction. They are positioned randomly along the interior wall surface 24 of the drum 18. The geometric pattern shown in FIG. 2 is intended to be merely exemplary of many different patterns which could be employed.

The individual wall segments 24, 24' are constructed of materials having widely varying coefficients of friction. As exemplary of different materials which may be employed, one can list both natural and synthetic polymers such as polyethylene, polytetrafluoroethylene, polypropylene and the like, and metals such as aluminum, steel and the like. If desired, several different segments 24, 24' can be constructed of the same or similar materials which have been surface treated to impart different coefficients of friction. For example, one segment 24, 24' may be constructed of a polished metal, whereas an adjacent or nearby segment 24, 24' is constructed of the same metal which has been mechanically treated to roughen its surface. Many variations upon the geometry and materials of construction will undoubtedly occur to those skilled in the art, the general principal being to maximize and randomize variation in the coefficients of friction.

Figure 4:
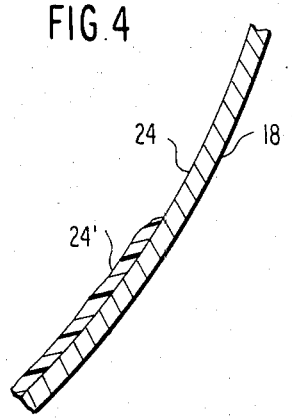
FIG. 4 is a cross-sectional view of a portion of the drum wall, having affixed to its inner surface a thin layer of material which imparts a desired coefficient of friction to a wall segment.

The individual segments 24, 24' can be provided by affixing thin layers of the desired materials, preferably by means of an adhesive which avoids the need for mechanical fixation, to the interior wall surface 24 of the drum 18, as illustrated in FIG. 4.

The method of this invention can be understood with reference to FIGS. 2 and 3. The rotating tumbler drum 18 of the invention is positioned such that the opening 20 through which the potato chips 14 are introduced is elevated with respect to the discharge opening 22, so that the potato chips 14 are moved by gravitation toward the discharge opening 22 of the drum 18. Potato chips 14 are fed from a hopper 26 through the opening 20 at the elevated end of the drum 18 and travel downwardly by gravitation. The drum 18 is rotated in the direction indicated by the arrow in FIG. 3. When the potato chips 14 reach the portion of the drum 18 containing the individual segments 24, 24' of varying coefficients of friction, some of the potato chips 14 are carried further up the side of the drum 18 than others, due to the differential rotary frictional forces which are imparted, resulting in the random tumbling motion.

The seasoning material can be dispensed onto the tumbling potato chips 14 using any convenient means. One convenient means of dispensing the seasoning material onto the tumbling potato chips 14 is a seasoning dispenser 28 commercially available from Acrison Inc. of Moonachie, N.J. A motor-driven auger 30 extends through a hopper 32 and a metering tube 34. The seasoning dispenser 28 is positioned with the metering tube 34 extending into the opening 22 at the discharge end of the rotating tumbler drum 18. The end section of the metering tube 34 is positioned directly over the tumbling mass of potato chips 14 in the portion of the drum 18 which contains the wall segments 24, 24' of varying coefficients of friction, as shown in FIG. 2. Seasoning material is loaded into the hopper 32 and is distributed along the length of the metering tube 34 by the auger 30. When the seasoning material reaches the end portion of the metering tube 34, it drops through a series of openings (not shown) to form a seasoning curtain, indicated by means of arrows in FIG. 2.

The seasoning curtain lands on the randomly tumbling mass of potato chips 14, causing the seasoning material to be uniformly distributed. The potato chips 14 are then discharged through the opening 22 at the discharge end of the rotating tumbler drum 18. If desired, the rotating tumbler drum 18 can be provided with a lip 36 at the discharge end, which acts as a weir, causing a larger mass of potato chips 14 to build up inside the rotating tumbler drum 18.

Since many modifications, variations and changes in detail may be made to the described embodiment, it is intended that all matter in the foregoing description and shown in the accompanying drawings be interpreted as illustrative and not in a limiting sense.

What is claimed is:

1. A rotating tumbler drum for use in a snack food seasoning apparatus in which seasoning material is dropped onto a tumbling mass of fragile, three-dimensional, non-uniform snack food items, the rotating tumbler drum comprising a drum having an opening at one end through which snack food items can be introduced and an opening at the other end through which snack food items can be discharged and through which means extend into the interior of the drum for distributing the seasoning material, with improvements for providing random movement of a tumbling mass of the snack food items in which the interior wall surface of the drum comprises, on its interior surface along at least a portion of its length, a plurality of randomly sized and positioned wall segments having significantly differing coefficients of friction with respect to the remaining portion of the interior surface of the drum, so that rotation of the drum causes the snack food items within the drum to tumble in a random manner while seasoning material is dropped onto them.

* * * * *